(12) United States Patent
Marupaduga et al.

(10) Patent No.: US 10,856,166 B1
(45) Date of Patent: Dec. 1, 2020

(54) WIRELESS RELAY MEASUREMENT REPORTING IN A WIRELESS COMMUNICATION NETWORK

(71) Applicant: Sprint Communications Company L.P., Overland Park, KS (US)

(72) Inventors: Sreekar Marupaduga, Overland Park, KS (US); Rajveen Narendran, Olathe, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 69 days.

(21) Appl. No.: 16/109,255

(22) Filed: Aug. 22, 2018

(51) Int. Cl.
*H04W 24/10* (2009.01)
*H04W 88/04* (2009.01)
*H04W 76/27* (2018.01)
*H04W 76/14* (2018.01)
*H04W 48/08* (2009.01)

(52) U.S. Cl.
CPC .......... *H04W 24/10* (2013.01); *H04W 48/08* (2013.01); *H04W 76/14* (2018.02); *H04W 76/27* (2018.02); *H04W 88/04* (2013.01)

(58) Field of Classification Search
None
See application file for complete search history.

(56) References Cited

U.S. PATENT DOCUMENTS

| | | | |
|---|---|---|---|
| 8,270,908 B2 | 9/2012 | Wang et al. | |
| 8,983,481 B2 | 3/2015 | Chen | |
| 9,107,084 B2 | 8/2015 | Siomina et al. | |
| 9,591,499 B2 | 3/2017 | Comsa et al. | |
| 2009/0005029 A1 | 1/2009 | Wang et al. | |
| 2012/0250560 A1* | 10/2012 | Chun | H04L 5/0053 370/252 |
| 2013/0095747 A1* | 4/2013 | Moshfeghi | H04B 7/0413 455/7 |
| 2013/0208601 A1 | 8/2013 | Cui et al. | |
| 2013/0265960 A1 | 10/2013 | Wang et al. | |
| 2019/0059098 A1* | 2/2019 | Zhang | H04L 5/0091 |

FOREIGN PATENT DOCUMENTS

| | | |
|---|---|---|
| WO | 2012037025 A1 | 3/2012 |
| WO | 2017069593 A1 | 4/2017 |

* cited by examiner

*Primary Examiner* — Adnan Baig (57) ABSTRACT

A wireless relay serves wireless User Equipment (UEs). In the wireless relay, a user transceiver exchanges user signaling and user data with the UEs and exchanges access signaling and the user data with a network transceiver. The network transceiver determines wideband radio measurements and wirelessly exchanges the user data and relay signaling with a wireless data network over the wideband. The relay signaling includes the access signaling and the wideband radio measurements. The network transceiver determines when communication quality for the UEs falls below a quality threshold. In response, the network transceiver determines sub-band radio measurements for the sub-bands within the wideband and wirelessly exchanges additional relay signaling with the wireless data network over the sub-bands. The additional relay signaling has the sub-band radio measurements. The network transceiver may receive instructions to determine sub-band radio measurements instead of wideband radio measurements.

8 Claims, 7 Drawing Sheets

WIRELESS RELAY MEASUREMENT REPORTING IN A WIRELESS COMMUNICATION NETWORK

TECHNICAL BACKGROUND

Wireless data networks serve wireless User Equipment (UEs) with mobile data communication services like internet access, voice calling, and video calling. The wireless UEs could be computers, phones, headsets, graphic displays, vehicles, drones, or some other wireless communication apparatus. The wireless data networks have macrocell base stations that wirelessly exchange user data and signaling over the air with these wireless UEs. To extend their wireless coverage, the wireless data networks also have wireless relays that wirelessly exchange user data and signaling over the air between the wireless UEs and the macrocell base stations. The wireless relays are sometimes referred to as femtocell base stations and picocell base stations.

The wireless UEs, wireless relays and wireless base stations communicate over a wideband frequency spectrum. The wideband frequency spectrum is divided into several sub-bands that each have a sub-band frequency spectrum. The typical wideband spectrum is several megahertz wide and is centered at or near the gigahertz frequency range. The typical sub-band frequency spectrum is hundreds of kilohertz wide.

The wireless UEs and wireless relays take radio measurements in the sub-bands of the wideband. The radio measurements comprise signal strength, signal quality, noise and interference, and the like. The wireless UEs and wireless relays average and aggregate the sub-band radio measurements into wideband radio measurements. The wireless UEs and wireless relays report the wideband radio measurements to the wireless data network.

In some scenarios, the macrocell base stations direct the wireless UEs and relays to use sub-band radio measurements. In response, the wireless UEs and wireless relays take radio measurements in the sub-bands but do not average and aggregate the sub-band radio measurements into wideband radio measurements. The wireless UEs and wireless relays report selected sub-band radio measurements to the wireless data network. Thus, the wireless UEs and wireless relays avoid bad sub-bands by using sub-band radio measurement reports to the wireless data network.

Unfortunately, some macrocell base stations have power amplifiers with poor frequency response in some parts of the wideband—usually toward the middle of the wideband. The poor frequency response degrades wireless signal propagation and causes wireless session drops and lost communication packets for the wireless UEs. The wireless relays have not been optimized to mitigate these wireless session drops and lost communication packets that are caused by the underperforming power amplifiers in the macrocell base stations.

TECHNICAL OVERVIEW

A wireless relay serves wireless User Equipment (UEs). In the wireless relay, a user transceiver exchanges user signaling and user data with the UEs and exchanges access signaling and the user data with a network transceiver. The network transceiver determines wideband radio measurements and wirelessly exchanges the user data and relay signaling with a wireless data network over the wideband. The relay signaling includes the access signaling and the wideband radio measurements. The network transceiver determines when communication quality for the UEs falls below a quality threshold. In response, the network transceiver determines sub-band radio measurements for the sub-bands within the wideband and wirelessly exchanges additional relay signaling with the wireless data network over the sub-bands. The additional relay signaling has the sub-band radio measurements. The network transceiver may receive instructions to determine sub-band radio measurements instead of wideband radio measurements.

DETAILED DESCRIPTION

Figure 1:
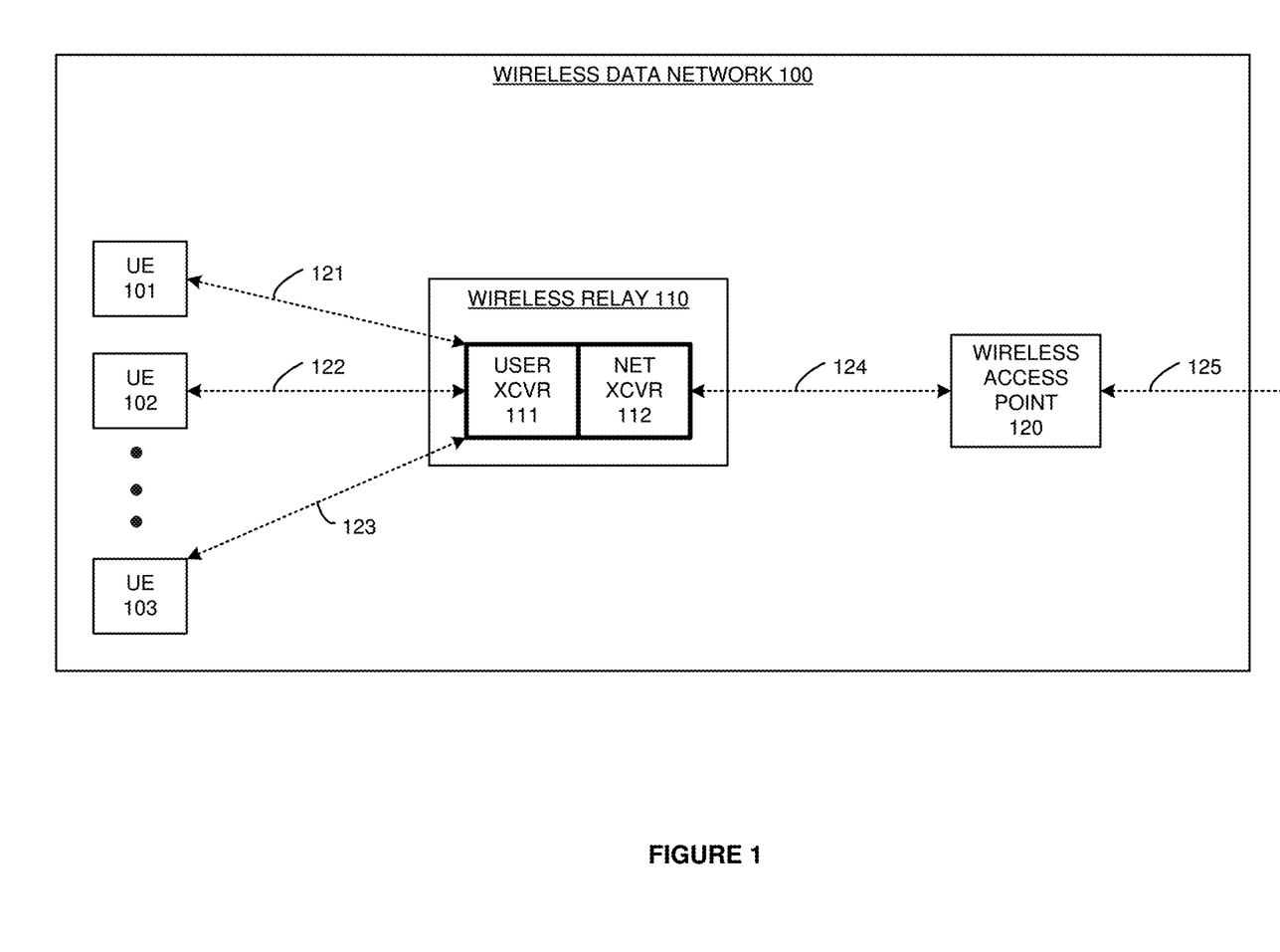
FIG. 1 illustrates a wireless data network that controls wideband and sub-band measurement reporting in a wireless relay.

FIG. 1 illustrates wireless data network 100 to control wideband and sub-band measurement reporting in wireless relay 110. Wireless data network 100 comprises User Equipment (UEs) 101-103, wireless relay 110, and wireless access point 120. Wireless relay 110 comprises user transceiver (XCVR) 111 and net transceiver 112. UEs 101-103 and user transceiver 111 in wireless relay 110 communicate over wireless communication links 121-123. User transceiver 111 and net transceiver 112 within wireless relay 110 communicate over bus circuitry, Institute of Electrical and Electronic Engineers 802.3 (ethernet) circuitry, memory circuitry, or the like. Net circuitry 112 in wireless relay 110 and wireless access point 120 communicate over wireless communication link 124. Wireless access point 120 communicates with various network elements in wireless data network 100 over data communication links 125. Wireless communication links 121-123 use Fifth Generation New Radio (5GNR), Long Term Evolution (LTE), Institute of Electrical and Electronic Engineers 802.11 (WIFI), or the like. Wireless communication link 124 uses 5GNR, Long Term Evolution, or some other wireless protocol having wideband and sub-band measurement reporting. Data communication links 125 may use ethernet, internet protocol, or some other data protocol to transport user data and network signaling for LTE, 5G Core (5GC), and the like.

UEs 101-103 could be computers, phones, headsets, graphic displays, vehicles, drones, or some other wireless communication apparatus. UEs 101-103 comprise antennas, modulators, amplifiers, filters, digital/analog interfaces, Digital Signal Processors (DSPs), memory circuitry, firmware/software, and bus circuitry. UEs 101-103 use wireless network protocols like 5GNR, LTE, and WIFI. UEs 101-103 comprise Central Processing Unit (CPU) circuitry, memory circuitry, software, bus circuitry, and data communication circuitry. The software includes an operating system and modules for the Physical Layer (PHY), Media Access Control (MAC), Radio Link Control (RLC), Packet Data Convergence Protocol (PDCP), Radio Resource Control (RRC), Service Data Application Protocol (SDAP), and the like.

User transceiver 111 comprises antennas, modulators, amplifiers, filters, digital/analog interfaces, DSPs, memory circuitry, firmware/software, and bus circuitry. User transceiver 111 uses wireless network protocols like 5GNR, LTE, and WIFI. User transceiver 111 comprises CPU circuitry, memory circuitry, software, bus circuitry, and data communication circuitry. The software includes an operating system and modules for the PHY, MAC, RLC, PDCP, RRC, SDAP, and the like.

Net transceiver 112 comprises antennas, modulators, amplifiers, filters, digital/analog interfaces, DSPs, memory circuitry, firmware/software, and bus circuitry. Net transceiver 112 uses wireless network protocols like 5GNR and LTE. Net transceiver 112 comprises CPU circuitry, memory circuitry, software, bus circuitry, and data communication circuitry. The software includes an operating system and modules for the PHY, MAC, RLC, PDCP, RRC, SDAP, and the like.

Wireless access point 120 comprises antennas, modulators, amplifiers, filters, digital/analog interfaces, DSPs, memory circuitry, firmware/software, and bus circuitry. Wireless access point 120 uses wireless network protocols like 5GNR and LTE. Wireless access point 120 comprises CPU circuitry, memory circuitry, software, bus circuitry, and data communication circuitry. The software includes an operating system and modules for the PHY, MAC, RLC, PDCP, RRC, SDAP, and the like.

User transceiver 111 exchanges user signaling and user data with UEs 101-103. Exemplary user signaling comprises 5GNR RRC transporting 5GC N1, LTE RRC transporting Non-Access Stratum (NAS), and WIFI. Exemplary user data comprises 5GNR RRC, LTE RRC, and WIFI. User transceiver 111 exchanges access signaling and the user data with net transceiver 112. Exemplary access signaling comprises 5GNR X2, 5GC N2 transporting 5GC N1, LTE X2, and LTE S1-MME transporting LTE NAS. Exemplary user data comprises 5GC N3 and LTE S1-U.

In wireless relay 110, net transceiver 112 determines wideband radio measurements within a wideband. The wideband may be a 20 megahertz wireless channel or greater. Exemplary wideband radio measurements comprise signal strength, signal quality, noise and interference, antenna rank, and the like. In some examples, wireless relay 110 takes many sub-band radio measurements in the wideband and then averages and aggregates the sub-band radio measurements into the wideband radio measurements.

Net transceiver 112 wirelessly exchanges relay signaling and user data with wireless access point 120 over one or more sub-bands in the wideband of wireless link 124. The relay signaling includes the wideband radio measurements like signal strength, quality, noise, and interference. Exemplary relay signaling comprises 5GNR RRC transporting the relay's 5GC N1 and LTE RRC transporting the relay's LTE NAS. Exemplary user data comprises 5GNR RRC (transporting 5GC X2, N1, N2, N3) and LTE RRC (transporting X2, NAS, S1-MME, S1-U). Wireless access point 120 exchanges network signaling and user data with various elements in wireless data network 100 over data communication links 125. Exemplary network signaling comprises 5GNR X2, 5GC N2, LTE X2, and LTE S1-MME. Exemplary user data comprises 5GC N3 (transporting 5GC N1, N2, N3) and LTE RRC (transporting LTE NAS, S1-MME, and S1-U).

Net transceiver 112 determines when wireless communication quality for UEs 101-103 falls below a quality threshold. Exemplary quality thresholds comprise an amount of UE session drops, lost packets, re-transmissions, transmission errors, and the like. In some examples, net transceiver 112 receives an instruction from wireless access node 120 to use sub-band radio measurements instead of wideband radio measurements in response to excessive UE session drops or some other quality issue. In some examples, user transceiver 111 detects when the wireless communication quality for UEs 101-103 falls below the quality threshold and responsively transfers the instruction to net transceiver 112 and wireless access point 120. For example, user transceiver 111 may detect that a rolling average of the session drop rate for UEs 101-103 exceeds a drop rate threshold. In response, user transceiver 111 transfers the instructions to net transceiver 112 and wireless access point 120 to use sub-band radio measurements instead of wideband radio measurements.

Net transceiver 112 responsively determines sub-band radio measurements within sub-bands of the wideband. The sub-band may be a 1 megahertz channel or smaller. For example, the sub-band may be a single 5GNR resource block, a set of adjacent LTE resource blocks, or some other spectrum block. Exemplary sub-band radio measurements comprise signal strength, signal quality, noise and interference, antenna rank, and the like. Net transceiver 112 exchanges additional relay signaling with wireless access point 120 over one or more sub-bands in the wideband of wireless link 124. This additional relay signaling includes the sub-band radio measurements like signal strength, quality, noise, and interference. Advantageously, net transceiver 112 detects and avoids poor sub-bands in the wideband by taking and reporting sub-band measurements. Thus, net transceiver 112 automatically avoids bad sub-bands on wireless link 124 when wireless communication quality for UEs 101-103 falls below a quality threshold.

Figure 2:
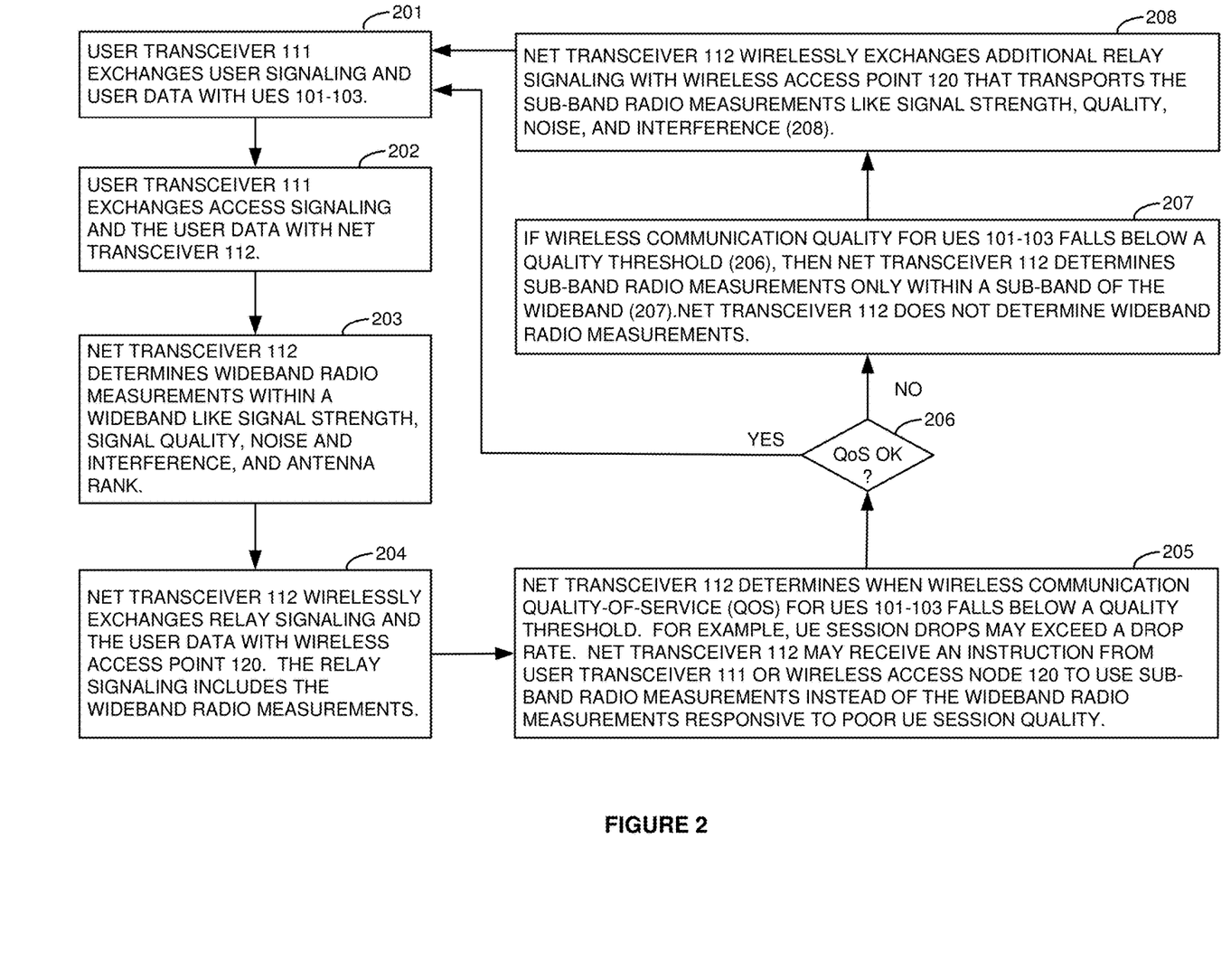
FIG. 2 illustrates the operation of the wireless relay to control its wideband and sub-band measurement reporting.

FIG. 2 illustrates the operation of wireless relay 110 to control wideband and sub-band measurement reporting. User transceiver 111 exchanges user signaling and user data with UEs 101-103 (201). User transceiver 111 exchanges access signaling and the user data with net transceiver 112 (202). Net transceiver 112 determines wideband radio measurements within a wideband like signal strength, signal quality, noise and interference, and antenna rank (203). Net transceiver 112 wirelessly exchanges relay signaling and the user data with wireless access point 120 over the wideband (204). The relay signaling includes the wideband radio measurements.

Net transceiver 112 determines when wireless communication Quality-of-Service (QoS) for UEs 101-103 falls below a quality threshold (205). For example, UE session drops may exceed a drop rate or UE lost packets may exceed a loss rate. In addition, net transceiver 112 may receive an instruction from user transceiver 111 or wireless access node 120 to use sub-band radio measurements instead of the wideband radio measurements responsive to their detection of poor UE session quality.

If wireless communication QoS for UEs 101-103 remains above the quality threshold (206), then the operation repeats (201). If the wireless communication QoS for UEs 101-103 falls below the quality threshold (206), then net transceiver 112 determines sub-band radio measurements only within sub-bands of the wideband (207). Net transceiver 112 does not report wideband radio measurements. Net transceiver 112 wirelessly exchanges additional relay signaling with wireless access point 120 that transports the sub-band radio measurements like signal strength, quality, noise, and interference (208). The operation repeats (201). Advantageously, net transceiver 112 automatically avoids bad sub-bands on wireless communication link 124 when wireless communication quality for UEs 101-103 falls below a quality threshold.

Figure 3:
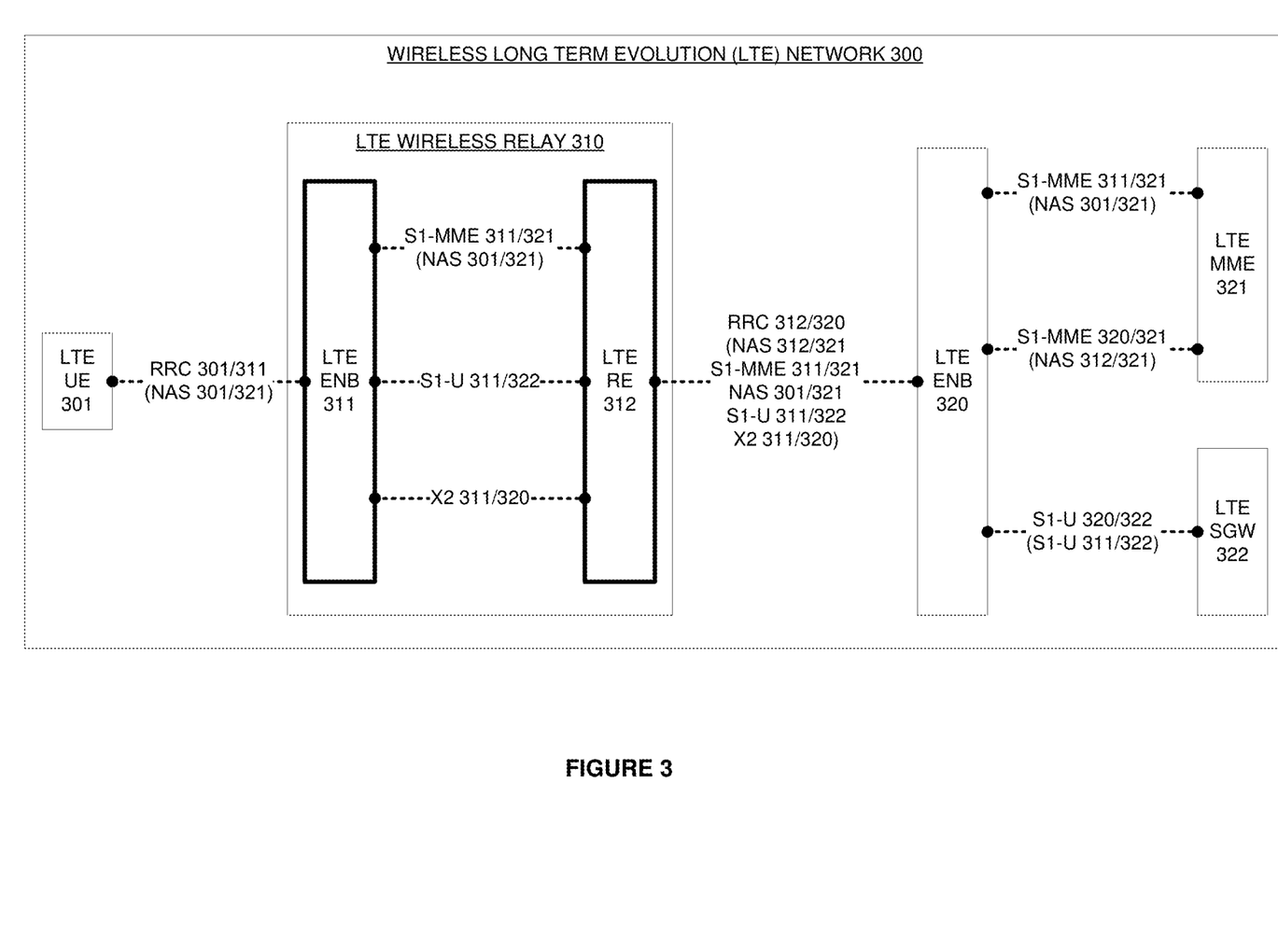
FIG. 3 illustrates a wireless Long Term Evolution (LTE) network that controls wideband and sub-band measurement reporting in a wireless relay.

FIG. 3 illustrates wireless Long Term Evolution (LTE) network 300 that controls wideband and sub-band measurement reporting in a wireless relay 310. LTE network 300 comprises LTE UE 301, wireless relay 310, evolved Node B (eNodeB) 320, Mobility Management Entity (MME) 121, and Serving Gateway (S-GW) 322. Other LTE network elements like Home Subscriber System (HSS), Packet Data Network Gateway (P-GW), Policy Charging Rules Function (PCRF), and Internet Protocol Multimedia Subsystem (IMS) are not shown for clarity. LTE wireless relay 310 comprises LTE ENB 311 and LTE Relay Equipment (RE) 312 that are coupled by ethernet, bus circuitry, memory circuitry, or some other data link. For clarity, only one UE is shown, but there would be several other UEs that are coupled to wireless relay 310 like UE 301.

LTE MME 321 and LTE UE 301 exchange NAS 301/321 over ENB 320 and wireless relay 310. LTE MME 321 and RE 312 exchange NAS 312/321 over ENB 320. MME 321 and ENB 311 exchange S1-MME 311/321 over LTE RE 312 and ENB 320. MME 321 and ENB 320 exchange S1-MME 320/321. NAS 301/321 is transported by S1-MME 311/321 and RRC 301/311. NAS 312/321 is transported by S1-MME 320/321 and RRC 312/320. S1-MME 311/321 is transported by RRC 312/320.

In response to the signaling described above, LTE UE 301 and ENB 311 wirelessly exchange user data over RRC 301/311. ENB 311 and RE 312 exchange the user data over S1-U 311/322. RE 312 and ENB 320 wirelessly exchange S1-U 311/322 in RRC 312/320. ENB 320 and S-GW 322 wirelessly exchange S1-U 311/322 in S1-U 320/322.

In wireless relay 310, LTE RE 312 determines wideband radio measurements. For example, the wideband may be a 100 megahertz channel centered near two gigahertz. The wideband radio measurements comprise signal strength and channel quality averaged and aggregated across the entire wideband. LTE RE 312 wirelessly transfers the wideband radio measurements to ENB 320 over RRC 312/320.

ENB 320 determines when the number of session drops for UE 301 and the other UEs that are served by wireless relay 310 exceeds a threshold—which indicates that wireless communication quality for the UE has fallen below a quality threshold. In response, ENB 320 transfers an instruction to RE 312 over RRC 312/320 to stop wideband measurement reporting and begins sub-band measurement reporting. In response to the instruction, LTE RE 312 determines sub-band radio measurements within sub-bands of the wideband. A sub-band comprises an LTE resource block or a few adjacent LTE resource blocks. The sub-band radio measurements comprise signal strength and channel quality across the sub-band. LTE RE 312 wirelessly transfers the sub-band radio measurements to ENB 320 over RRC 312/320. LTE RE 312 avoids using bad resource blocks by only reporting on the better performing resource blocks. RE 312 may also track and avoid poor resource blocks—especially at specific geographic locations.

In various examples, ENB 311 in wireless relay 310 may detect a loss in wireless communication quality for UE 301 and its other UEs. ENB 311 may then transfer the instruction to use sub-band measurements to LTE RE 312—and also to ENB 320 over X2 311/320. MME 321 may detect a loss in wireless communication quality for UE 301 and the other UEs. MME 321 then transfers the instruction to use sub-band measurements to LTE RE 312 over NAS 312/321 and to ENB 320 over S1-MME 320/321. MME 321 may transfer the instruction to ENB 311 over S1-MME 311/321 and ENB 311 could transfer the instruction to RE 312. MME 321 may transfer the instruction to ENB 320 over S1-MME 320/321, and ENB 320 could transfer the instruction to RE 312 over RRC 312/320.

Advantageously, LTE RE 312 automatically avoids bad sub-bands on RRC 312/320 when wireless communication quality for UE 301 and its other UEs falls below a quality threshold.

Figure 4:
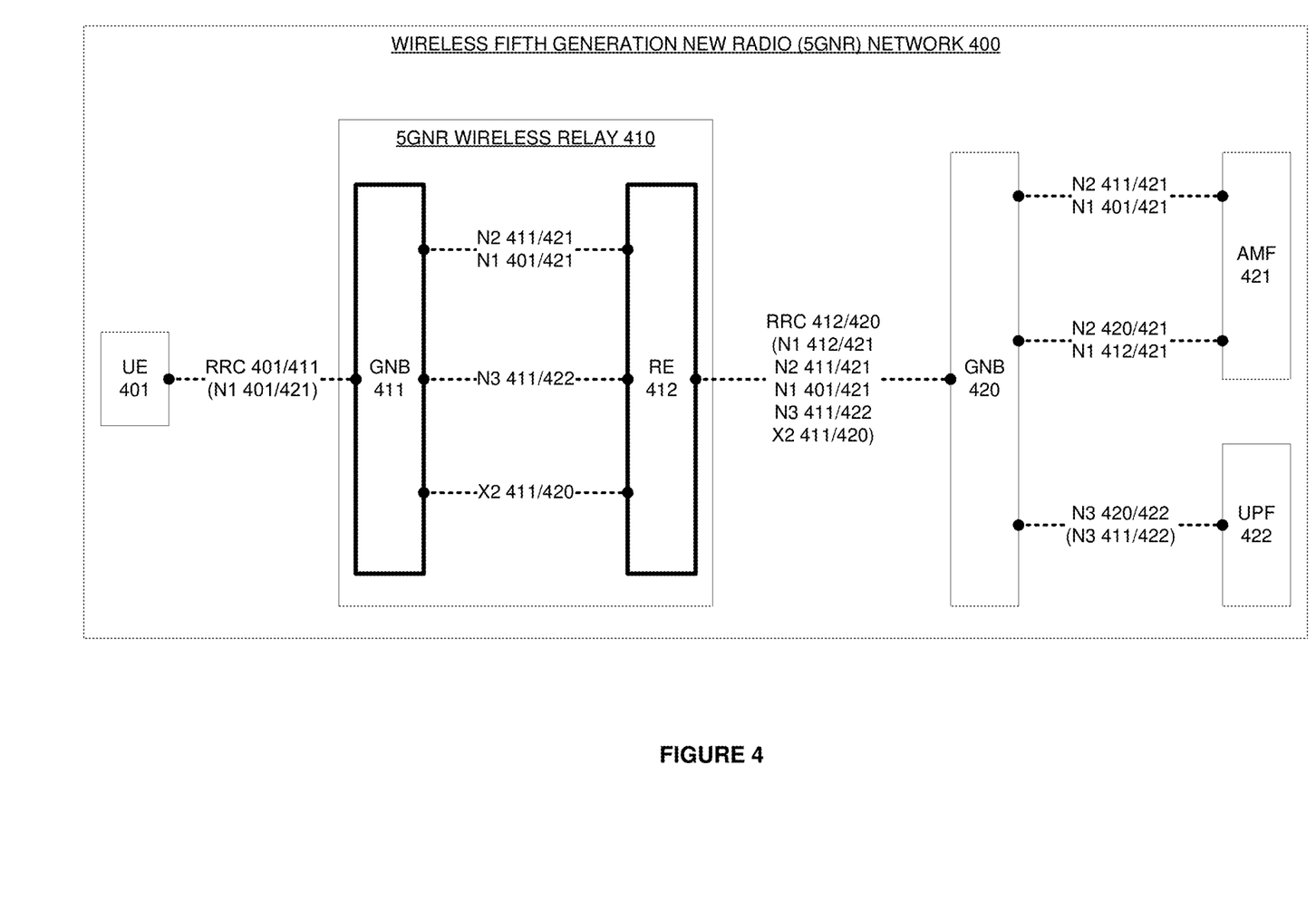
FIG. 4 illustrates a wireless Fifth Generation New Radio (5GNR) network that controls wideband and sub-band measurement reporting in a wireless relay.

FIG. 4 illustrates wireless Fifth Generation (5GNR) network 400 that controls wideband and sub-band measurement reporting in wireless relay 410. 5GNR network 400 comprises 5GNR UE 401, wireless relay 410, Next Generation Node B (GNB) 420, Access and Mobility Management Function (AMF) 421, and User Plane Function (UPF) 422. Other 5G Core (5GC) network elements like Authentication Server Function (AUSF), Unified Data Management (UDM), Policy Control Function (PCF), Session Management Function (SMF), and Application Functions (AFs) are not shown for clarity. 5GNR wireless relay 410 comprises 5GNR GNB 411 and 5GNR Relay Equipment (RE) 412 that are coupled by ethernet, bus circuitry, memory circuitry, or some other data link. For clarity, only one UE is shown, but there would be several other UEs that are coupled to wireless relay 410 like UE 401.

5GNR AMF 421 and 5GNR UE 401 exchange N1 401/421 over GNB 420 and wireless relay 410. 5GNR AMF 421 and RE 412 exchange N1 412/421 over GNB 420. AMF 421 and GNB 411 exchange N2 411/421 over 5GNR RE 412 and GNB 420. AMF 421 and GNB 420 exchange N2 420/421. N1 401/421 is transported by RRC 412/420 and RRC 401/411. N1 412/421 is transported by RRC 412/420. N2 411/421 is transported by RRC 412/420.

In response to the signaling described above, 5GNR UE 401 and GNB 411 wirelessly exchange user data over RRC 401/411. GNB 411 and RE 412 exchange the user data over N3 411/422. RE 412 and GNB 420 wirelessly exchange N3 411/422 in RRC 412/420. GNB 420 and UPF 422 wirelessly exchange N3 411/422 in N3 420/422.

In wireless relay 410, 5GNR RE 412 determines wideband radio measurements. For example, the wideband may be a 200 megahertz channel centered near six gigahertz. The wideband radio measurements comprise signal strength and channel quality across the entire wideband. 5GNR RE 412 wirelessly transfers the wideband radio measurements to GNB 420 over RRC 412/420.

GNB 420 determines when the number of session drops for UE 401 and the other UEs that are served by wireless relay 410 exceeds a threshold—which indicates that wireless communication quality for the UEs has fallen below a quality threshold. In response, GNB 420 transfers an instruction to RE 412 over RRC 412/420 to stop wideband measurement reporting and begin sub-band measurement reporting. In response to the instruction, 5GNR RE 412 determines sub-band radio measurements within sub-bands of the wideband. A sub-band comprises a 5GNR resource block or a few adjacent resource blocks. The sub-band radio measurements comprise signal strength and channel quality across the sub-band. 5GNR RE 412 wirelessly transfers the sub-band radio measurements to GNB 420 over RRC 412/420. 5GNR RE 412 avoids using bad resource blocks by reporting on better performing resource blocks. RE 312 also tracks and avoids poor resource blocks—especially in specific geographic locations.

In various examples, GNB 411 in wireless relay 410 may detect a loss in wireless communication quality for UE 401 and the other UEs. GNB 411 may then transfer instructions to use sub-band measurements to 5GNR RE 412 and to GNB 420 over X2 411/420. AMF 421 may detect a loss in wireless communication quality for UE 401 and the other UEs. AMF 421 then transfers the instructions to use sub-band measurements to 5GNR RE 412 over N1 412/421 and to GNB 420 over N2 420/421. AMF 421 may transfer the instruction to GNB 411 over N2 411/421, and GNB 411 transfers the instruction to RE 412. AMF 421 may transfer the instruction to GNB 420 over N2 420/421, and GNB 420 transfers the instruction to RE 412 over RRC 412/420.

Advantageously, 5GNR RE 412 automatically avoids bad sub-bands on RRC 412/420 when wireless communication quality for UE 401 and its other UEs falls below a quality threshold.

Figure 5:
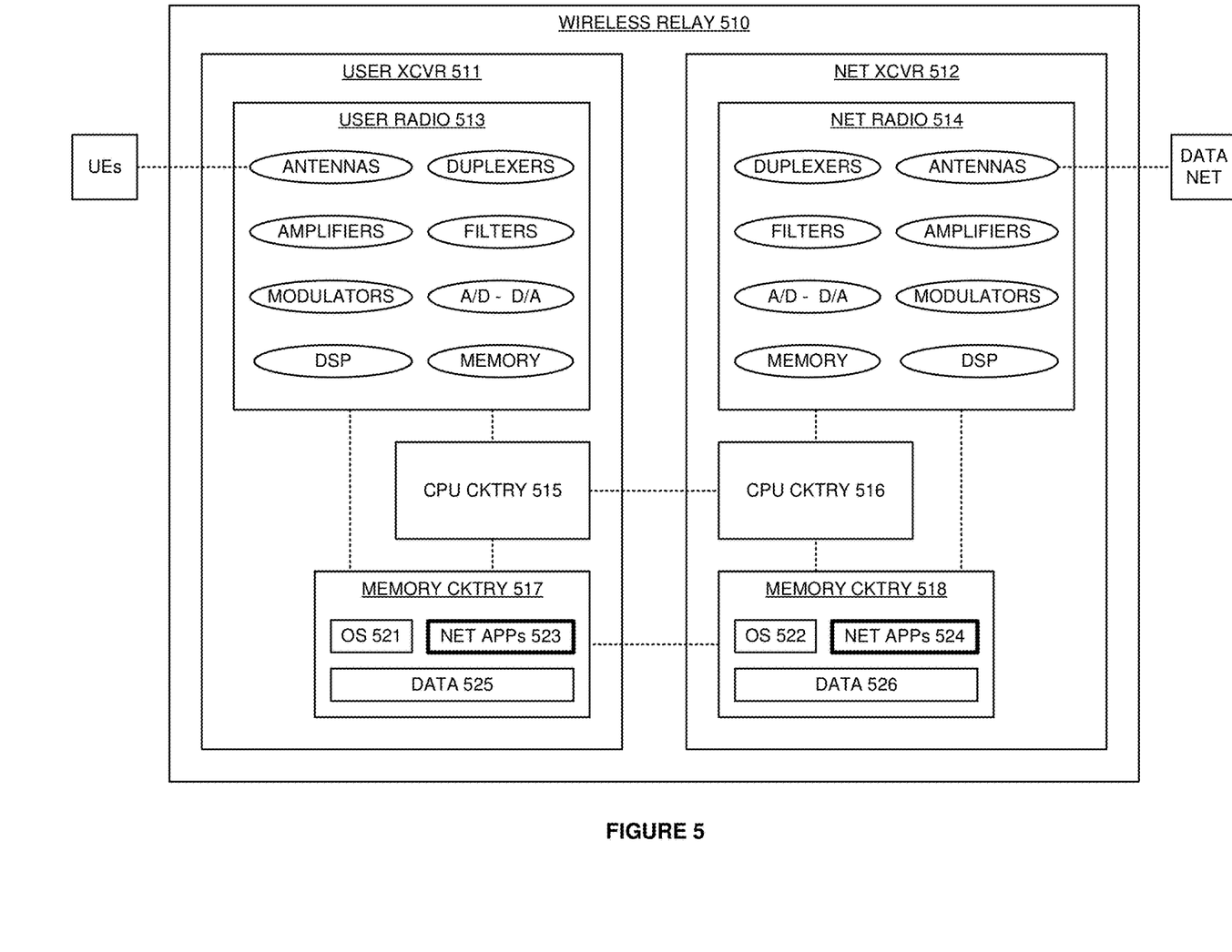
FIG. 5 illustrates a hardware architecture for a wireless relay to control its wideband and sub-band measurement reporting.

FIG. 5 illustrates a hardware architecture for wireless relay 510 to control its wideband and sub-band measurement reporting. Wireless relay 510 comprises user transceiver (XCVR) 511 and net transceiver 512. User transceiver 511 comprises user radio 513, CPU circuitry 515, and memory circuitry 517 that that are coupled over bus links. Memory circuitry 517 stores an operating system (OS) 521, net apps 523, and data 525. User radio 513 is coupled to CPU circuitry 515 and memory circuitry 517 over bus circuitry. CPU circuitry 515 and memory circuitry 517 are coupled over bus circuitry.

Net transceiver 512 comprises net radio 514, CPU circuitry 516, and memory circuitry 518. Net radio 514 is coupled to CPU circuitry 516 and memory circuitry 518 over bus circuitry. CPU circuitry 516 and memory circuitry 518 are coupled over bus circuitry. Memory circuitry 518 stores an operating system 522, net apps 524, and data 526. CPU circuitry 515-516 are coupled together over Ethernet links or bus circuitry. Memory circuitry 517-518 are coupled over Ethernet links or bus circuitry.

User radio 513 comprises antennas, duplexers, filters, amplifiers, modulators, Analog-to-Digital converters (A/D) and Digital-to-Analog converters (D/A), DSP circuitry, and memory. The memory stores data and DSP firmware/software. In user radio 513, the DSP circuitry drives the wireless exchange of the data with the UEs. Thus, the DSP circuitry in user radio 513 may detect bad QoS for the UEs. CPU circuitry 515 executes operating system 521 and net apps 523 to control the exchange of data 525 between the UEs and memory circuitry 517.

CPU circuitry 515-516 execute operating systems 521-522 and net apps 523-524 to manage the exchange of data 525-526 between memory circuitry 517-518. CPU circuitry 515 executes operating system 521 and net apps 523 to direct the exchange of data 525-526 between memory circuitry 517-518. CPU circuitry 516 executes operating system 522 and net apps 524 to direct the exchange of data 525-526 between memory circuitry 517-518.

Net radio 514 comprises antennas, duplexers, filters, amplifiers, modulators, A/D and D/A, DSP circuitry, and memory. The memory stores data and DSP firmware/software. In net radio 514, the DSP circuitry drives the wireless exchange of the data with the data network. Thus, the DSP circuitry in net radio 514 may detect bad QoS for the UEs. CPU circuitry 516 executes operating system 522 and net apps 524 to control the exchange of data 526 between the data network and memory circuitry 518.

In net radio 514, the antennas receive wireless DL signals from the data network and transfer corresponding electrical DL signals through duplexers to the amplifiers. The amplifiers boost the DL signals for the filters which attenuate unwanted energy. The modulators down-convert the DL signals from their carrier frequencies. The A/Ds convert the analog DL signals into digital DL signals for the DSP circuitry. The DSP circuitry recovers DL data and signaling from the DL signals and transfers the recovered DL data and signaling from its internal memory to memory circuitry 518 as the DL portion of data 526. These components of net radio 514 determine wideband and sub-band radio measurements and store the measurements in memory circuitry 518. For example, the A/D may determine signal strength and the DSP may determine signal quality.

CPU circuitry 516 executes OS 522 to process the DL data and signaling in data 526 in memory circuitry 518 through net apps 524. Net apps 524 direct CPU circuitry 516 to transfer DL data and signaling in data 526 to memory circuitry 517 to become the DL portion of data 525. CPU circuitry 515 executes OS 521 to process DL data and signaling in data 525 in memory circuitry 517 through net apps 523. Net apps 523 direct CPU circuitry 515 to transfer DL data and signaling in data 525 to the UEs.

In user radio 513, the DSP circuitry retrieves the DL data and signaling from memory circuitry 517 and transfers corresponding DL signals to the D/As. The D/As convert the DL signals into analog DL signals for the modulators. The modulators up-convert the DL signals to their carrier frequencies. The amplifiers boost the DL signals for the filters which attenuate unwanted out-of-band energy. The filters transfer the DL signals through the duplexers to the antennas. The electrical DL signals drive the antennas to emit corresponding wireless DL signals to the UEs.

In user radio 513, the antennas receive wireless UL signals from the UEs and transfer corresponding electrical UL signals through the duplexers to the amplifiers. The amplifiers boost the UL signals for the filters which attenuate unwanted energy. The modulators down-convert the UL signals from their carrier frequencies. The A/Ds convert the analog UL signals into digital UL signals for the radio DSP circuitry. The radio DSP circuitry recovers UL data and signaling from the UL signals and transfers the recovered UL data and signaling from its internal memory to memory circuitry 517 as the UL portion of data 525.

CPU circuitry 515 executes OS 521 to process UL data and signaling in data 525 in memory circuitry 517 through net apps 523. Net apps 523 direct CPU circuitry 515 to transfer the UL data and signaling to memory circuitry 518. CPU circuitry 516 executes OS 522 to process the UL data and signaling in data 526 in memory circuitry 518 through net apps 524. Net apps 524 direct CPU circuitry 516 to transfer the UL data and signaling in data 526 from memory circuitry 518 to the data net. This UL signaling includes the wideband or sub-band radio measurements.

In net radio 514, the DSP circuitry retrieves the UL data and signaling from data 526 in memory circuitry 518 and transfers corresponding UL signals to the D/As. The D/As convert the UL signals into analog UL signals for the modulators. The modulators up-convert the UL signals to their carrier frequencies. The amplifiers boost the UL signals for the filters which attenuate unwanted out-of-band energy. The filters transfer the UL signals through the duplexers to the antennas. The electrical UL signals drive the antennas to emit corresponding wireless UL signals to the data network.

Net apps 524 determine when wireless communication quality for the UEs is lacking and responsively drive the use of sub-band measurements in net radio 514. Net apps 523 may also determine that wireless communication quality for the UEs is lacking drive the use of sub-band measurements in net radio 514 through net apps 524. Net apps 524 may receive instructions from the data network to use sub-band measurements responsive to poor wireless communication quality for the UEs detected by the data network, and in response, net apps 524 would direct CPU circuitry 516 to drive net radio 514 to use sub-band measurements.

Figure 6:
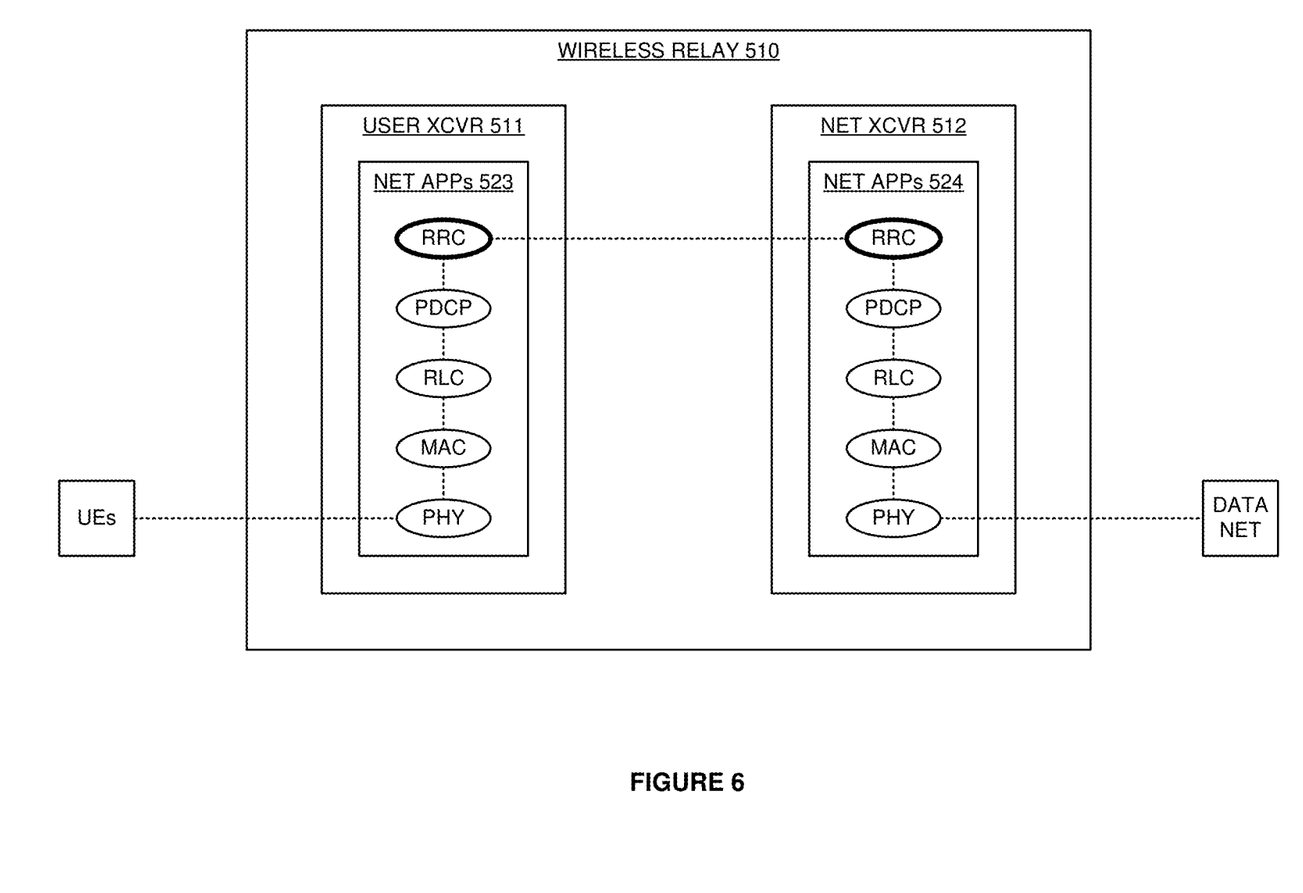
FIG. 6 illustrates a software architecture for the wireless relay to control its wideband and sub-band measurement reporting.

FIG. 6 illustrates a software architecture for wireless relay 510 to control its wideband and sub-band measurement reporting. Wireless relay 510 comprises user transceiver (XCVR) 511 and net transceiver 512. User transceiver 511 comprises net apps 523 and net transceiver 512 comprises net apps 524. Net apps 523-524 each comprise Physical Layer (PHY), Media Access Control (MAC), Radio Link Control (RLC), Packet Data Convergence Protocol (PDCP), and Radio Resource Control (RRC) components.

In net apps 523 of user transceiver 511, the PHY component exchanges data and signaling with the UEs. The PHY component performs PHY functions like inverse fast Fourier transforms/fast Fourier transforms, control insertion/removal, resource element mapping/de-mapping, precoding, layer mapping/de-mapping, modulation mapping de-mapping, channel estimation, channel equalization, inverse discrete Fourier transforms, channel coding/decoding, rate matching/de-matching, and scrambling/de-scrambling.

In net apps 523 of user transceiver 511, the MAC component determines buffer status, power headroom, channel quality, Hybrid Automatic Repeat Request (HARQ) acknowledgements, UE identifiers, and the like. To perform HARQ on the UL, the MAC component transfers ACKs for UL data and signaling to the UEs. To perform random access, the MAC component processes access signaling from the UEs to initiate scheduling. To perform power control, the MAC component processes channel quality and power headroom to adjust UE power to overcome poor channel quality within headroom and interference limits. To perform scheduling, the MAC component processes radio channel quality, buffer status, and radio interference to assign data and signaling to wireless payloads. The MAC component signals the schedule to the UEs. In most cases, the MAC component processes performance data like data-rate, delay, error-rate, and jitter to maintain Quality-of-Service (QoS) for the UEs. Thus, the MAC component in user transceiver 511 may detect poor session quality for the UEs and trigger the use of sub-band measurement reports.

In net apps 523 of user transceiver 511, the RLC component maps between the MAC logical channels and PDUs or RBs. The RLC component performs ARQ for the UL data and signaling by transferring UL ACKs to the UEs. The RLC component performs ARQ for the DL by retransmitting DL data and signaling that was not properly received by the UEs. The PDCP component exchanges PDUs with the RLC component. The PDCP component maps between the RLC PDUs and Service Data Units (SDUs) for the RRC component. The PDCP component handles security by applying ciphering. The PDCP component performs header compression and decompression. The PDCP component adds sequence numbers and re-orders received SDUs in their proper sequence. The PDCP component eliminates duplicate UL data.

In net apps 523 of user transceiver 511, the RRC component establishes and terminates data sessions for the UEs. The RRC component exchanges RRC data and signaling with the data network. The RRC component supports UE messaging between the UEs and the data network. The RRC component directs the broadcast of system information. The RRC component handles security and key management. The LTE RRC component handles handover operations along with the UEs and the data network. The RRC component manages UE reporting including the use of wideband or sub-band measurements. The RRC component manages UE QoS. Thus, the RRC component in user transceiver 511 may detect poor session quality for the UEs and trigger the use of sub-band measurements. The RRC component in net apps 523 of user transceiver 511 and the RRC component in net apps 524 of user transceiver 512 exchange RRC data and signaling over transceivers 511-512 and ethernet/bus circuitry.

In net apps 524 of net transceiver 512, the RRC component establishes and terminates data sessions for the wireless relay 510. The RRC component exchanges RRC data and signaling with the data network. The RRC component supports UE messaging between the net transceiver 524 and the data network. The RRC component processes broadcasts of system information. The RRC component handles security and key management. The LTE RRC component handles relay handover operations for mobile relays with the data network. The RRC component manages relay reporting including the use of wideband or sub-band measurements. The RRC component manages relay QoS.

In net apps 524 of user transceiver 512, the PDCP component maps between the RLC PDUs and Service Data Units (SDUs) for the RRC component. The PDCP component exchanges PDUs with the RLC component. The PDCP component handles security by applying ciphering. The PDCP component performs header compression and decompression. The PDCP component adds sequence numbers and re-orders received SDUs in their proper sequence. The PDCP component eliminates duplicate UL data. The RLC component maps between the MAC logical channels and PDUs or RBs. The RLC component performs ARQ for the DL data and signaling by transferring ACKs to the data network. The RLC component performs ARQ for the UL by retransmitting UL data and signaling that was not properly received by the data network.

In net apps 524 of user transceiver 512, the MAC component determines buffer status, power headroom, channel quality, Hybrid Automatic Repeat Request (HARQ) acknowledgements, UE identifiers, and the like. To perform HARQ on the DL, the MAC component transfers ACKs for DL data and signaling for to the data network. To perform random access, the MAC component transfers access signaling to the data network to initiate scheduling. To perform power control, the MAC component processes channel quality and power headroom to adjust relay power to overcome poor channel quality within headroom and interference limits. To perform scheduling, the MAC component receives assignments of data and signaling to wireless payloads for the data network. In most cases, the MAC component processes performance data like data-rate, delay, error-rate, and jitter to report Quality-of-Service (QoS) for the relay.

In net apps 524 of user transceiver 512, the PHY component exchanges data and signaling with the data network. The PHY component performs PHY functions like inverse fast Fourier transforms/fast Fourier transforms, control insertion/removal, resource element mapping/de-mapping, precoding, layer mapping/de-mapping, modulation mapping de-mapping, channel estimation, channel equalization, inverse discrete Fourier transforms, channel coding/decoding, rate matching/de-matching, and scrambling/de-scrambling.

Advantageously, net transceiver 512 automatically avoids bad sub-bands to the data network when wireless communication quality for the UEs falls below a quality threshold.

Figure 7:
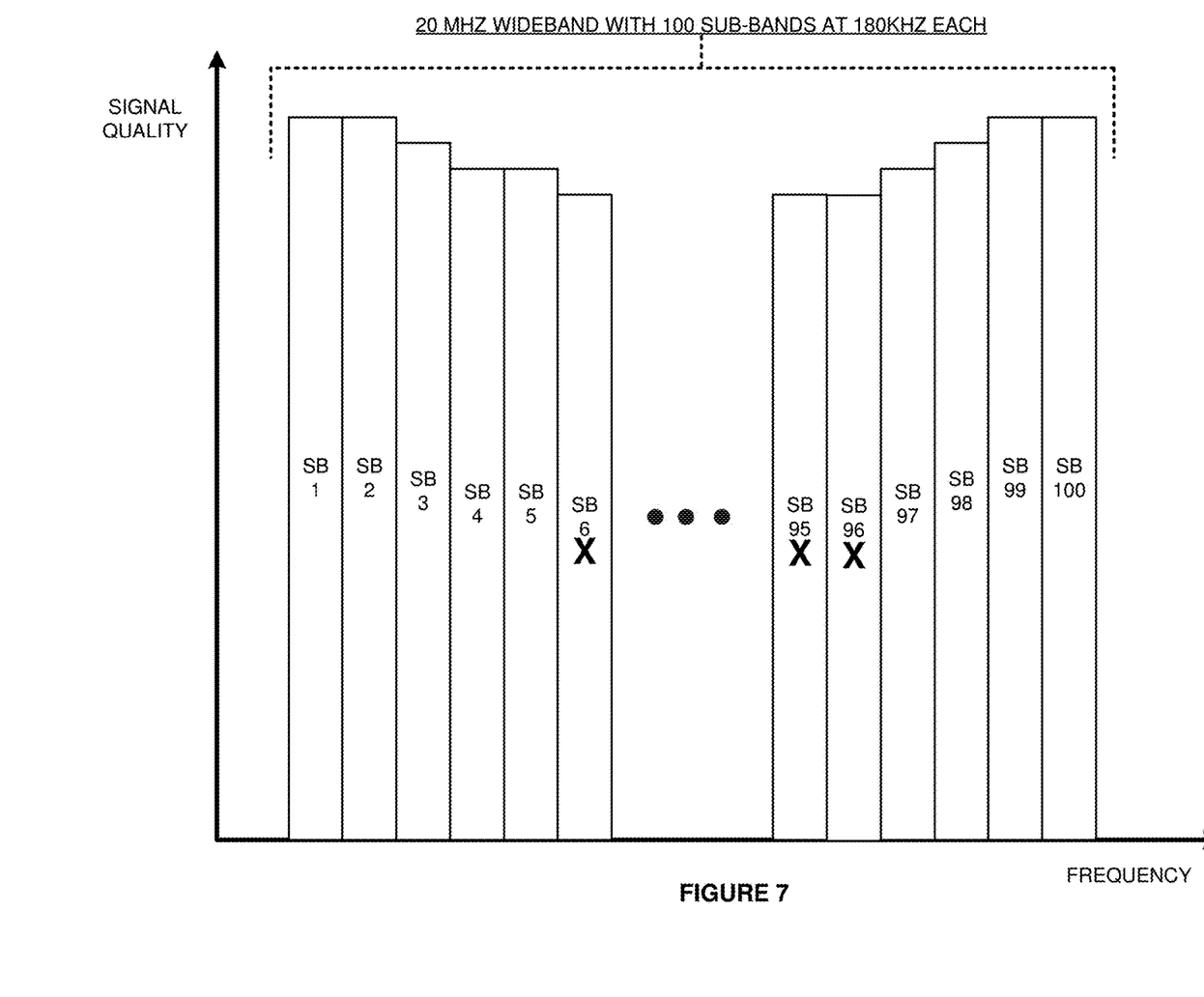
FIG. 7 illustrates a wideband with sub-bands.

FIG. 7 illustrates a wideband with sub-bands. The vertical axis indicates signal quality and the horizontal axis indicates radio frequency. A 20 Megahertz (MHz) wideband is shown. The 20 MHz wideband is typically centered somewhere in or near the Gigahertz (GHz) radio spectrum. The 20 MHz wideband has 100 sub-bands that are each 180 Kilohertz (KHz) wide. Initially, the wireless relays described herein take radio measurements across multiple sub-bands and then average or aggregate the radio measurements for the entire wideband. The wireless relays report their averaged and aggregated wideband radio measurements to the data network.

When their UE QoS falls too far, the wireless relays only take radio measurements in individual sub-bands and report the individual sub-band measurements. For example, a wireless relay may take radio measurements in individual sub-bands 5-6 and 95-97, but since the radio measurements for individual sub-bands 6 and 95-96 are poor (as indicated by the X), the wireless relay only reports the radio measurements for good sub-bands 5 and 97 (although the data for bad sub-bands 6 and 95-96 could be included). The wireless relays store data indicating bad sub-bands for the specific geographic location and time. If the poor sub-band status remains, the wireless relay may stop using the poor sub-band altogether at the specific geographic location and time.

The wireless relay circuitry described above comprises computer hardware and software that form a special-purpose machine—relay circuitry that uses sub-band measurements when QoS suffers for the UEs that it serves. The computer hardware comprises processing circuitry like CPUs, DSPs, Graphical Processing Units (GPUs), transceivers, bus circuitry, and memory. To form these computer hardware structures, semiconductors like silicon or germanium are positively and negatively doped to form transistors. The doping comprises ions like boron or phosphorus that are embedded within the semiconductor material. The transistors and other electronic structures like capacitors and resistors are arranged and metallically connected within the semiconductor to form devices like logic circuitry and storage registers. The logic circuitry and storage registers are arranged to form larger structures like control units, logic units, and Random-Access Memory (RAM). In turn, the control units, logic units, and RAM are metallically connected to form CPUs, DSPs, GPUs, transceivers, bus circuitry, and memory.

In the computer hardware, the control units drive data between the RAM and the logic units, and the logic units operate on the data. The control units also drive interactions with external memory like flash drives, disk drives, and the like. The computer hardware executes machine-level software to control and move data by driving machine-level inputs like voltages and currents to the control units, logic units, and RAM. The machine-level software is typically compiled from higher-level software programs. The higher-level software programs comprise operating systems, utilities, user applications, and the like. Both the higher-level software programs and their compiled machine-level software are stored in memory and retrieved for compilation and execution. On power-up, the computer hardware automatically executes physically-embedded machine-level software that drives the compilation and execution of the other computer software components which then assert control. Due to this automated execution, the presence of the higher-level software in memory physically changes the structure of the computer hardware machines into special-purpose relay circuitry that uses sub-band measurements when UE QoS suffers.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. Thus, the invention is not limited to the specific embodiments described above, but only by the following claims and their equivalents.

What is claimed is:

1. A method of operating a wireless relay to serve wireless User Equipment (UEs), the method comprising:
    a relay user transceiver exchanging user signaling and user data with the UEs and exchanging access signaling and the user data with a relay network transceiver;
    the relay network transceiver determining wideband radio measurements within a wideband and wirelessly exchanging the user data and relay signaling with a wireless data network over sub-bands in the wideband wherein the relay signaling includes the access signaling and the wideband radio measurements and wherein the wideband is 20 megahertz or greater and the sub-bands are one megahertz or smaller;
    the relay network transceiver determining when wireless communication quality for the UEs falls below a quality threshold wherein the quality threshold comprises an amount of wireless session drops for the UEs;
    the relay network transceiver receiving an instruction to determine the sub-band radio measurements instead of the wideband radio measurements wherein receiving the instruction comprises receiving Radio Resource Control (RRC) signaling having the instruction from the wireless data network; and,
    the relay network transceiver responsively determining sub-band radio measurements for the sub-bands within the wideband and wirelessly exchanging additional relay signaling with the wireless data network over the sub-bands wherein the additional relay signaling has the sub-band radio measurements.

2. The method of claim 1 further comprising the relay network transceiver avoiding some of the sub-bands in the wideband responsive to the wireless communication quality for the UEs falling below the quality threshold.

3. The method of claim 1 wherein the relay network transceiver receiving the instruction comprises the relay network transceiver receiving Non-Access Stratum Radio (NAS) signaling or N1 signaling having the instruction from the wireless data network.

4. The method of claim 1 wherein the relay network transceiver receiving the instruction comprises the relay user transceiver receiving S1-MME signaling, N2 signaling, or X2 signaling having the instruction from the wireless data network and transferring the instruction to the relay network transceiver.

5. A wireless relay to serve wireless User Equipment (UEs), the wireless relay comprising:
    a relay user transceiver configured to exchange user signaling and user data with the UEs and exchange access signaling and the user data with a relay network transceiver;
    the relay network transceiver configured to determine wideband radio measurements within a wideband and wirelessly exchange the user data and relay signaling with a wireless data network over sub-bands in the wideband wherein the relay signaling includes the access signaling and the wideband radio measurements, and wherein the wideband is 20 megahertz or greater and the sub-bands are one megahertz or smaller;

the relay network transceiver configured to determine when wireless communication quality for the UEs falls below a quality threshold wherein the quality threshold comprises an amount of wireless session drops for the UEs;

the relay network transceiver configured to receive an instruction to determine the sub-band radio measurements instead of the wideband radio measurements wherein the relay network transceiver is configured to receive Radio Resource Control (RRC) signaling having the instruction from the wireless data network; and the relay network transceiver configured to responsively determine sub-band radio measurements for the sub-bands within the wideband and wirelessly exchange additional relay signaling with the wireless data network over the sub-bands wherein the additional relay signaling has the sub-band radio measurements.

6. The wireless relay of claim 5 further comprising the relay network transceiver configured to avoid some of the sub-bands in the wideband responsive to the wireless communication quality for the UEs falling below the quality threshold.

7. The wireless relay of claim 5 wherein the relay network transceiver is configured to receive Non-Access Stratum Radio (NAS) signaling or N1 signaling having the instruction from the wireless data network.

8. The wireless relay of claim 5 wherein the relay network transceiver is configured to receive S1-MME signaling, N2 signaling, or X2 signaling having the instruction from the wireless data network and transfer the instruction to the relay network transceiver.

* * * * *